United States Patent
Bang et al.

(10) Patent No.: US 12,481,245 B2
(45) Date of Patent: Nov. 25, 2025

(54) METHOD AND APPARATUS FOR FILTERING NOISE FOR HOLOGRAPHIC DISPLAY

(71) Applicant: SEOUL NATIONAL UNIVERSITY R&DB FOUNDATION, Seoul (KR)

(72) Inventors: Kiseung Bang, Seoul (KR); Changwon Jang, Bellevue, WA (US); Byoungho Lee, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 17/797,032

(22) PCT Filed: Nov. 12, 2021

(86) PCT No.: PCT/KR2021/016534
§ 371 (c)(1),
(2) Date: Aug. 2, 2022

(87) PCT Pub. No.: WO2023/085467
PCT Pub. Date: May 19, 2023

(65) Prior Publication Data
US 2024/0184244 A1 Jun. 6, 2024

(51) Int. Cl.
*G03H 1/22* (2006.01)
(52) U.S. Cl.
CPC ... *G03H 1/2202* (2013.01); *G03H 2001/2207* (2013.01); *G03H 2223/53* (2013.01)

(58) Field of Classification Search
CPC .................................................. G03H 1/2202
See application file for complete search history.

(56) References Cited

U.S. PATENT DOCUMENTS

| 7,324,286 B1 * | 1/2008 | Glebov .................. G02F 1/135 359/30 |
| 10,838,359 B2 | 11/2020 | Shestak et al. |
| 2010/0110515 A1 | 5/2010 | Blais-Ouellette et al. |
| 2019/0204783 A1 * | 7/2019 | Kim ...................... G03H 1/2205 |

FOREIGN PATENT DOCUMENTS

| JP | 2010521699 A | 6/2010 |
| KR | 20180078024 A | 7/2018 |
| KR | 20180128249 A | 12/2018 |
| KR | 20190102536 A | 9/2019 |

(Continued)

OTHER PUBLICATIONS

International Search Report for PCT/KR2021/016534 mailed Jul. 8, 2022, 9 pages.

(Continued)

*Primary Examiner* — Edmond C Lau
(74) *Attorney, Agent, or Firm* — Kilpatrick Townsend & Stockton LLP (57) ABSTRACT

A method and apparatus for filtering noise for a holographic display are provided. The noise filtering apparatus includes a first filter implemented using a volume grating for filtering DC noise in light modulated by a spatial light modulator or a second filter implemented using a volume grating or a thin-film filter, which filters high-order noise in the light.

4 Claims, 9 Drawing Sheets

(56) References Cited

FOREIGN PATENT DOCUMENTS

KR            20210121950 A      10/2021

OTHER PUBLICATIONS

Notification of Reason for Refusal for KR 10-2020-0039433 dispatched on Apr. 19, 2021, all pages.
Grant of Patent for KR 10-2020-0039433 dispatched Sep. 8, 2021, all pages.
Bang et al., "Compact noise-filtering vol. gratings for holographic displays," Optics Letters vol. 44, No. 9, May 1, 2019, 4 pages.

* cited by examiner

METHOD AND APPARATUS FOR FILTERING NOISE FOR HOLOGRAPHIC DISPLAY

TECHNICAL FIELD

Embodiments of the present disclosure relate to a method and apparatus for filtering noise for a holographic display.

BACKGROUND ART

A holographic display is one of the most promising 3D display technologies. A holographic display, which copies a complex wavefront of light existing in nature as is and reproduces the same, is called the most natural 3D display method. Recently, studies on implementation of a head-mounted display (HMD) using a holographic display have been in active progress.

For commercialization of a holographic HMD, there are issues to address, such as high resolution, a wide viewing angle, and a wide eye-box. In addition, it should be possible to configure a holographic system in a small size so that a user can wear it. Since optical elements constituting existing holographic displays take up a considerably large volume, it is not easy to apply them to an HMD. In particular, since noise occurs along with an image in a holographic display, a noise filtering system is absolutely required, and a noise filtering system according to the related art, which is very large, makes it difficult to realize a compact size of the holographic display.

DESCRIPTION OF EMBODIMENTS

Technical Problem

The technical objective of the present disclosure is to provide a method and apparatus for effectively filtering DC noise or high-order noise of a holographic display.

Solution to Problem

An example of a noise filtering apparatus for a holographic display, according to an embodiment of the disclosure, includes: a first filter implemented using a volume grating for filtering DC noise in light modulated by a spatial light modulator or a second filter implemented using a volume grating or a thin-film filter, which filters high-order noise in the light.

An example of a noise filtering method for a holographic display, according to an embodiment of the disclosure, includes: filtering DC noise in light modulated by a spatial light modulator, by using a first filter implemented using a volume grating; or filtering high-order noise in the light by using a second filter implemented using a volume grating or a thin-film filter.

Advantageous Effects of Disclosure

According to an embodiment of the present disclosure, it is possible to effectively filter DC noise or high-order noise of a holographic display. Since DC noise is filtered, it is possible to filter background noise that was present with a bright intensity on the entire background of a holographic display screen. Also, as high-order noise is filtered, a ghost image effect in which duplicate images are displayed together with a desired image may be eliminated. In addition, a noise filtering apparatus may be implemented using a thin plate-type noise filter of several millimeters, thereby realizing a compact size of the apparatus.

MODE OF DISCLOSURE

Hereinafter, a method and apparatus for filtering noise for a holographic display, according to an embodiment of the present disclosure, will be described in detail with reference to the attached drawings.

Figure 1:
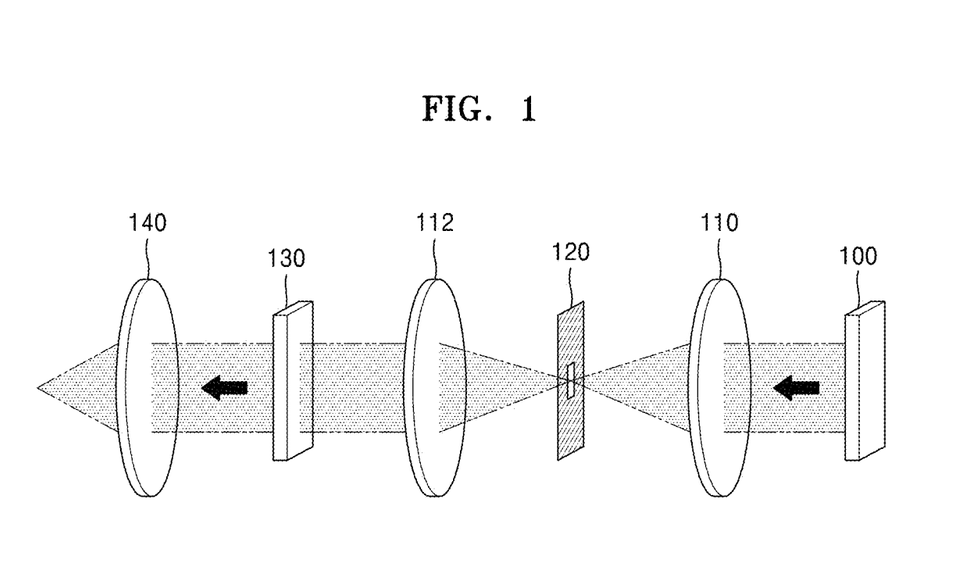
FIG. 1 illustrates an example of a structure of a holographic HMD using a 4-f system.

FIG. 1 illustrates an example of a structure of a holographic HMD using a 4-f system.

Referring to FIG. 1, the 4-f filtering system includes two lenses 110 and 112 and one spatial filter 120. A spatial light modulator (SLM) 100 receives an image light source and reproduces the same as a holographic image. When the holographic image output from the spatial light modulator 100 passes through the first 4-f lens 110, a Fourier plane is formed between the two lenses 110 and 112. The holographic image is divided, on the Fourier plane, into a region where noise occurs and a region where a signal is generated. The noise includes DC noise and high-order noise, and by filtering out these pieces of noise, only a signal image may be obtained. The spatial filter 120 filters noise by covering a region in which noise exists on the Fourier plane. A signal image from which noise is filtered while passing through the spatial filter 120 is displayed (130) through the second lens 112. The holographic image, from which noise is filtered, is provided for a user to view through an eyepiece 140.

The 4-f system requires an optical path as much as 4 times a focal length f of the lenses 110 and 112, and thus, a light path of several tens of cm is required even when using a lens having a short focal length. Therefore, the 4-f system takes up most of the volume of a holographic HMD designed using the 4-f system, and the size of the entire system increases accordingly.

Figure 2:
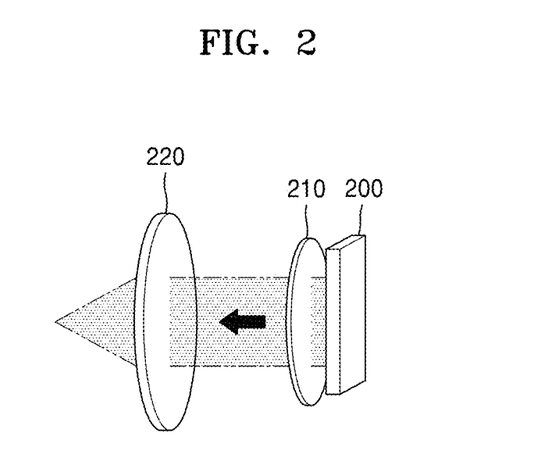
FIG. 2 illustrates an example of a structure of a holographic HMD using a noise filtering apparatus according to an embodiment of the present disclosure.

FIG. 2 illustrates an example of a structure of a holographic HMD using a noise filtering apparatus according to an embodiment of the present disclosure.

Referring to FIG. 2, a noise filtering apparatus 210 is located between a spatial light modulator 200 and an eyepiece 220. As illustrated in FIG. 1, in a holographic image output from the spatial light modulator 200, a signal and noise are located separately from each other in space on the Fourier plane. In other words, the holographic image output from the spatial light modulator 200 is divided into an angular region in which a signal exists and an angular region in which noise exists.

The noise filtering apparatus 210 according to the present embodiment filters noise in a holographic image, by transmitting through light that is within a certain angular range and absorbing and reflecting the rest of the light, by using a filter having different transmittances according to incident angles of the light. An example of the filter having different transmittances according to incident angles is illustrated in FIG. 3.

Figure 4:
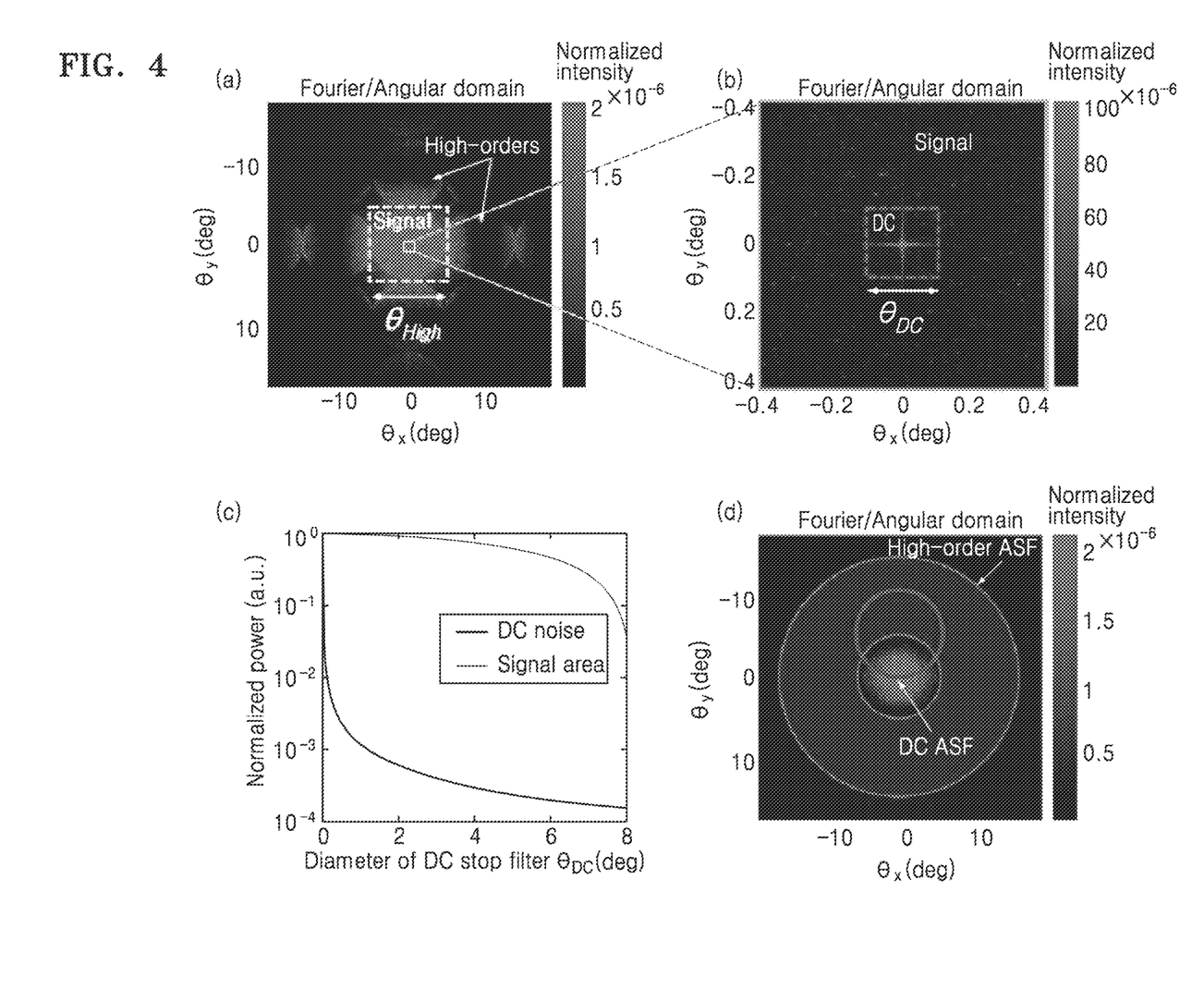
FIG. 4 illustrates an example of noise in a holographic image.

Noise in the holographic image largely includes DC noise and high-order noise, which will be described again below. DC noise exists mainly in a very narrow angular region and with high intensity, and high-order noise is a duplicate signal appearing around a desired signal, as illustrated in FIG. 4A.

The noise filtering apparatus 210 includes a DC angular stop filter (ASF) (hereinafter, 'first filter') for filtering DC noise and/or a high-order ASF (hereinafter, 'second filter') for filtering high-order noise. The noise filtering apparatus 210 may include the first filter and the second filter as two physically separated filters, or the first filter and the second filter together in one medium.

Figure 3:
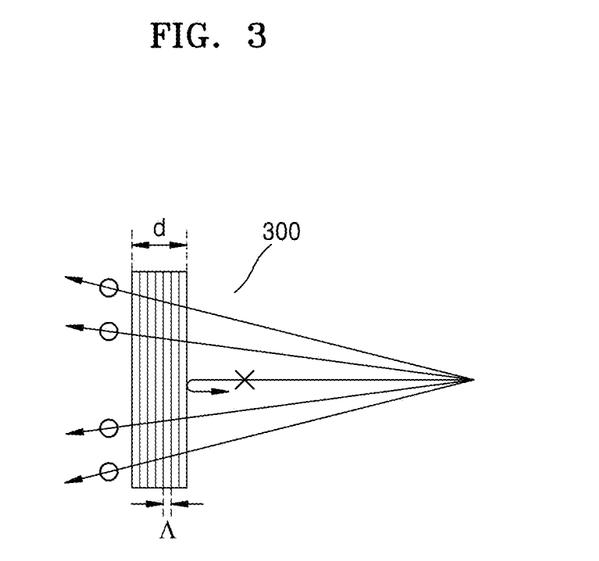
FIG. 3 illustrates an example of a filter using a volume grating, according to an embodiment of the present disclosure.

For example, the noise filtering apparatus 210 may include the first filter and the second filter each implemented using a volume grating of FIG. 3, or include the first filter implemented using a volume grating and the second filter implemented using a thin-film filter.

Since a filter using the volume grating of FIG. 3 or a thin-film filter has a thickness of only several mm, the noise filtering apparatus 210 having a compact size may be implemented, and accordingly, a small holographic HMD may be implemented. FIG. 3 illustrates an example of a filter using a volume grating, according to an embodiment of the present disclosure.

Referring to FIG. 3, a noise filtering apparatus for filtering DC noise or high-order noise may be implemented using a filter 300 using a volume grating. A volume grating filter may be manufactured by engraving a volume grating in a transparent substrate, such as glass. Various methods according to the related art, for manufacturing a volume grating may be applied to the present embodiment.

$u(x, y)$ $T(\theta_x, \theta_y)$ $u'(x, y)$ $$U'(f_x, f_y) = F(u'(x, y)) \quad \text{[Equation 1]}$$
$$= T(\sin^{-1}(\lambda f_x), \sin^{-1}(\lambda f_y)) \cdot U(f_x, f_y)$$

$F(\cdot)$

An example of DC noise and high-order noise caused by a pixelated structure of the spatial light modulator 200 is illustrated in FIGS. 4A and 4B. A desired signal is located around the origin and high-order noise appears as a series of duplicate signals. A period of the high-order noise is determined by a pixel pitch (d) of a spatial light modulator (SLM).

$$\theta_{HIGH} = \sin^{-1}\left(\frac{\lambda}{d}\right) \quad \text{[Equation 2]}$$

DC noise is shown as a small dot in a center of a signal region, which is expressed by the mathematical equation as below.

$$U_{DC}(f_x, f_y) = r_b\left(1 - \frac{a^2}{d^2}\right)L_xL_y \, \text{sinc}\,(f_xL_x, f_yL_y) \quad \text{[Equation 3]}$$

Here, $L_x$ and $L_y$ denote a width and a height of a spatial light modulator (SLM), respectively, 'a' denotes a length of an active region of each pixel, and 'b' denotes reflectance of a black matrix of a liquid crystal cell.

DC noise has a high intensity in a very narrow angular region and thus has a high optical density (OD) and a narrow angular bandwidth. FIG. 4C shows signal power and DC noise.

The volume grating filter for filtering DC noise and high-order noise may be implemented using a reflective volume grating having high angular selectivity and high diffraction efficiency.

A Bragg angle of a volume grating is determined in air as below.

$$\theta_0 = \sin^{-1}\left(n\sqrt{1 - (K/2\beta)^2}\right) \quad \text{[Equation 4]}$$

$$K = 2\pi/\Lambda$$

$\Lambda$ denotes a grating period, and a propagation constant is $\beta = 2\pi n/\lambda$.

The volume grating reflects incident light around the Bragg angle. A diffraction efficiency $\eta$ of the volume grating is as below.

$$\eta = 1/\left[1 + 1/\left(\frac{v\sinh\sqrt{v^2 - \zeta^2}}{\sqrt{v - \zeta^2}}\right)\right] \quad \text{[Equation 5]}$$

에서, $$\zeta = -\frac{Kd(K/2\beta - \cos\theta')}{2(K/\beta - \cos\theta')} \quad \text{[Equation 6]}$$

$$v = \frac{j\pi n_1 d}{\lambda\sqrt{\cos\theta'(\cos\theta' - K/\beta)}} \quad \text{[Equation 7]}$$

where $\theta'$ denotes an incident angle of a volume grating medium, d and $n_1$ denote a thickness and refractive index modulation of the volume grating, respectively.

The first filter filtering DC noise may be implemented using a volume grating having a very narrow stop band around the Bragg angle of 0°. The stop band is defined by a difference between two nodes of the main lobe, and may be calculated by the condition below.

$$v^4 - \zeta^2 = -\pi^2 \quad \text{[Equation 8]}$$

Figure 5:
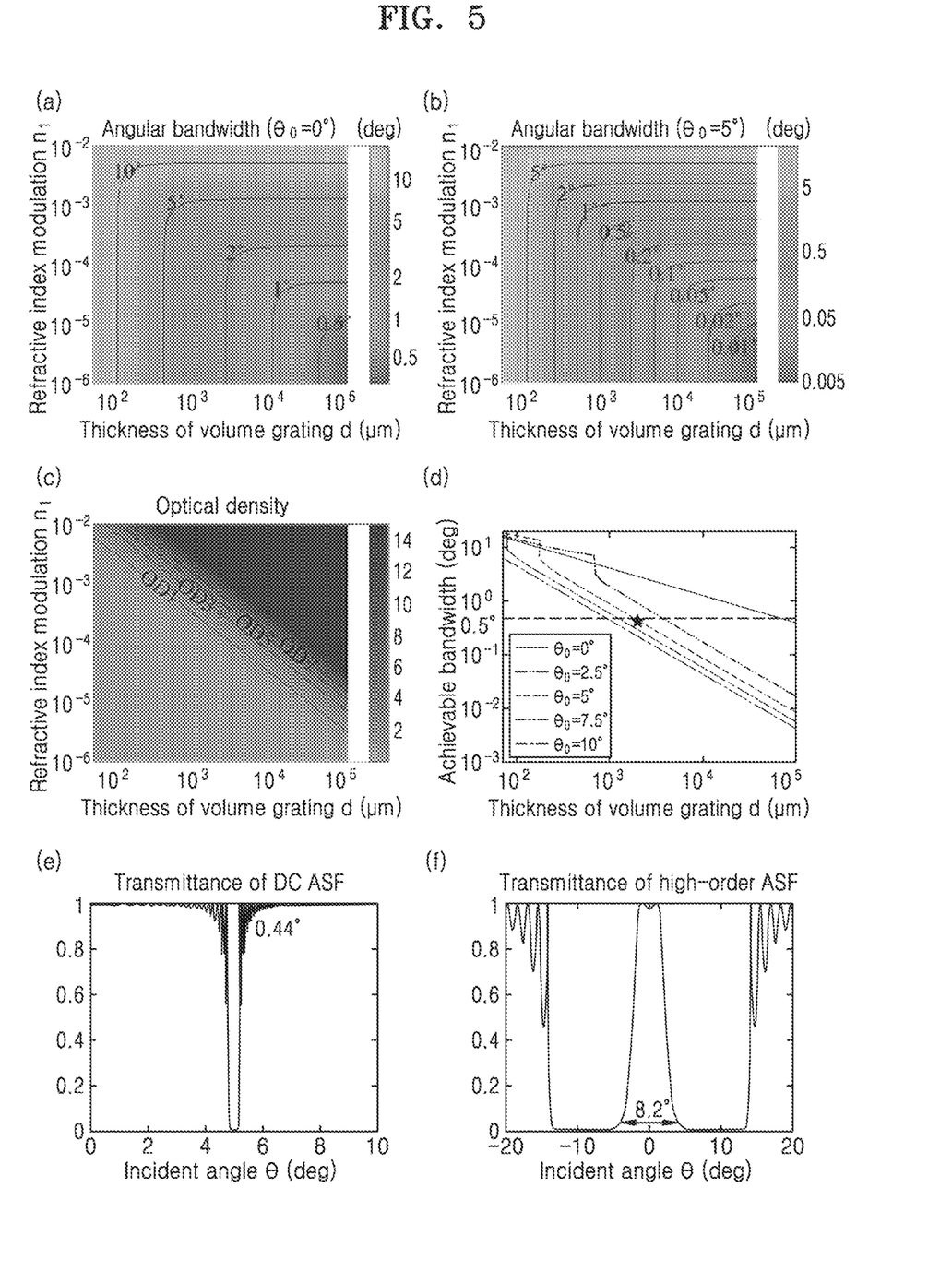
FIG. 5 illustrates an example of a band according to thickness and refractive index modulation.

FIG. 5 illustrates bands according to thickness (d) and refractive index modulation $n_1$. Referring to FIG. 5A, when the Bragg angle is 0 degrees, a thickness of several cm is required to form a narrow stop band of 0.5°. However, when the Bragg angle is not 0.5° as in FIG. 5B, a stop band may be formed with a smaller thickness. Referring to FIG. 5B, when the Bragg angle is 5 degrees, a thickness of 1 mm to 2 mm is required to form a narrow stop band of 0.5°. As in FIG. 5E, with the Bragg angle of 5°, $n_1=3.5*10^{\wedge}(-3)$, and the first filter having a thickness (d) of 2 mm with a stop band of 0.44° may be formed.

According to an embodiment, the first filter may be implemented using a volume grating having a Bragg angle of 0°, or a volume grating having a Bragg angle that is not 0°. For example, after the first filter is formed using a volume grating filter having a Bragg angle of 5°, the first filter may be installed and tilted by 5° with respect to the spatial light modulator. As another example, the volume grating may be written in a transparent substrate at a tilting angle of 5° with respect to the transparent substrate. In this case, DC noise output from the spatial light modulator at 0° enters the first filter at an incident angle of 5°, and thus, the first filter may remove the DC noise.

The second filter may be implemented using a reflective volume grating. The second filter is designed to use a wide main lobe instead of a narrow main lobe to remove high angle elements of incident light and transmit through low angle elements near 0 degrees. Because of the wide stop band, the second filter does not require a large thickness.

FIG. 5F shows the transmittance of the volume grating with d=50 and $n_1=0.017$. Referring to FIG. 5F, the transmittance of a volume grating filter having a pass-band of 8.2°, which may be used as a second filter, is shown.

Figure 6:
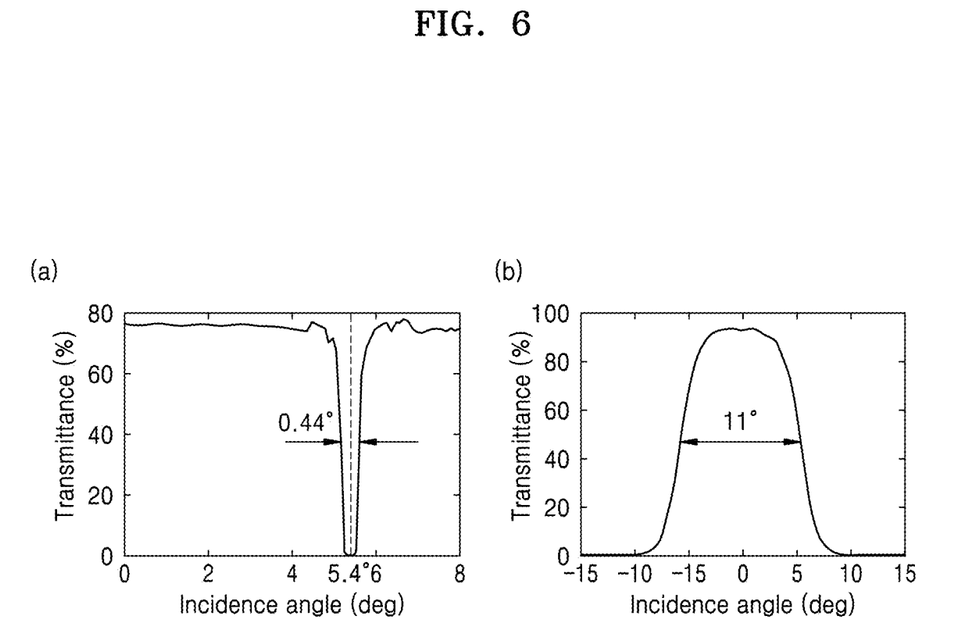
FIG. 6 illustrates transmittance of filters of a noise filtering apparatus.

In another embodiment, a volume grating filter having a thickness of 2 mm may be used as the first filter, and a thin-film filter may be used as the second filter. The volume grating filter is formed of a Photo-Thermo-Refractive (PTR) glass substrate, and the volume grating may be written in the glass substrate through near-ultraviolet exposure and heat treatment processes. Thin-film filters share the principle similar to that of a volume grating. Transmittance measured from the filters is shown in FIG. 6. Full width at half-maximum (FWHM) of the first filter and the second filter is 0.44° and 11°, respectively.

Figure 7:
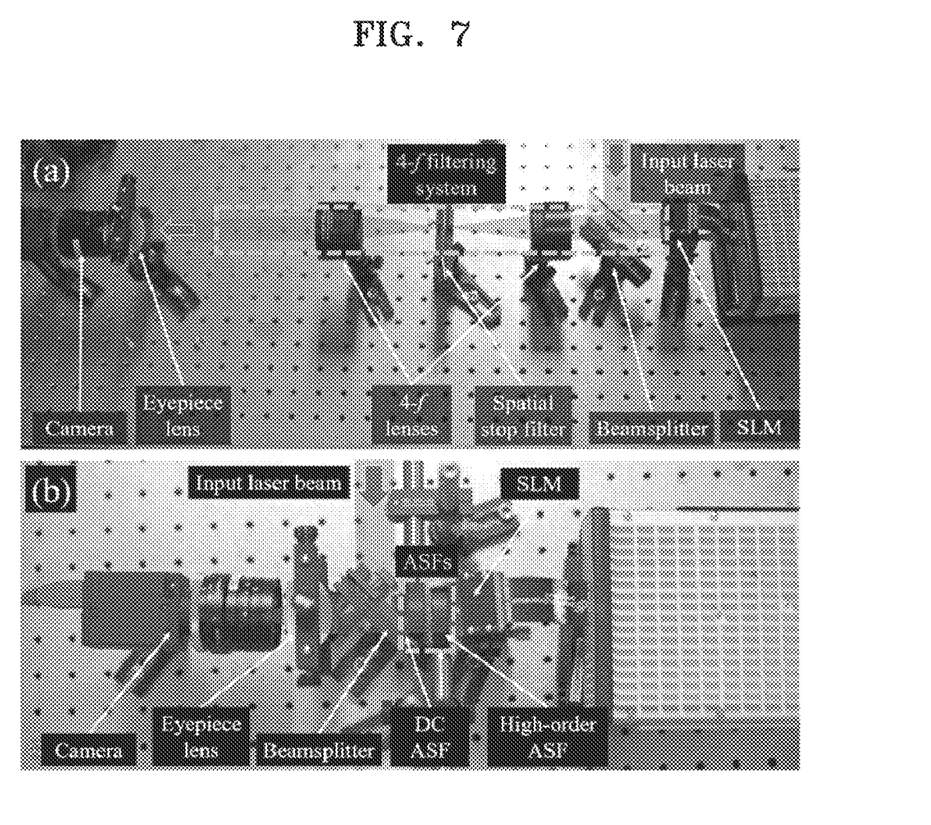
FIG. 7 illustrates an example of device setup for a holographic display.

FIG. 7 shows a device setup for a holographic display. FIG. 7A shows a holographic display setup with the 4-f system of FIG. 1, and FIG. 7B shows a holographic display setup with the noise filtering apparatus of FIG. 2.

A 532 nm-laser was used as a light source, and a phase-only 4K spatial light modulator (SLM) was used to generate a holographic image. A hologram is calculated by a point cloud method, and a phase of the hologram is displayed on the spatial light modulator. The hologram was imaged at a distance of 25 mm from the spatial light modulator, and a holographic image that has passed through the eyepiece was captured by a camera.

Figure 8:
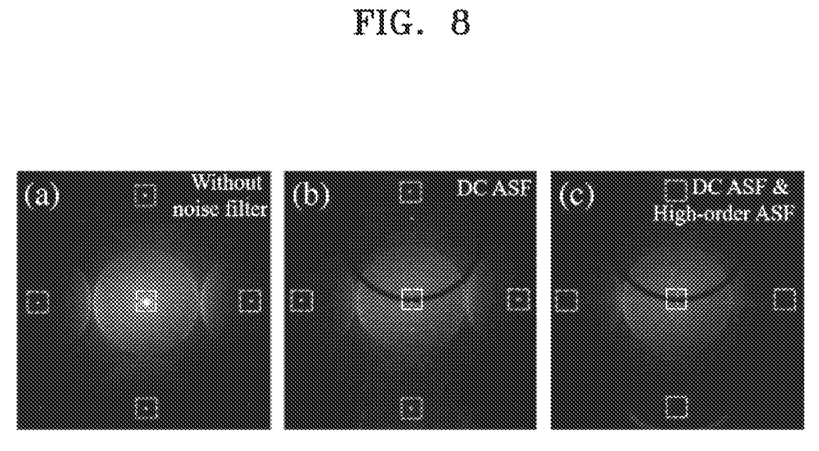
FIG. 8 illustrates an example of noise measured on a Fourier plane.

FIG. 8A shows an example of an image on a Fourier plane. DC noise and high-order noise are observed on the Fourier plane. When the first filter is inserted from the back of the spatial light modulator, the stop band of the first filter is formed in a narrow ring shape, and the first filter filters DC noise of a holographic image through the stop band as shown in FIG. 9C. In addition, when the second filter is added at the back of the first filter, high-order noise of the holographic image is filtered.

Figure 9:
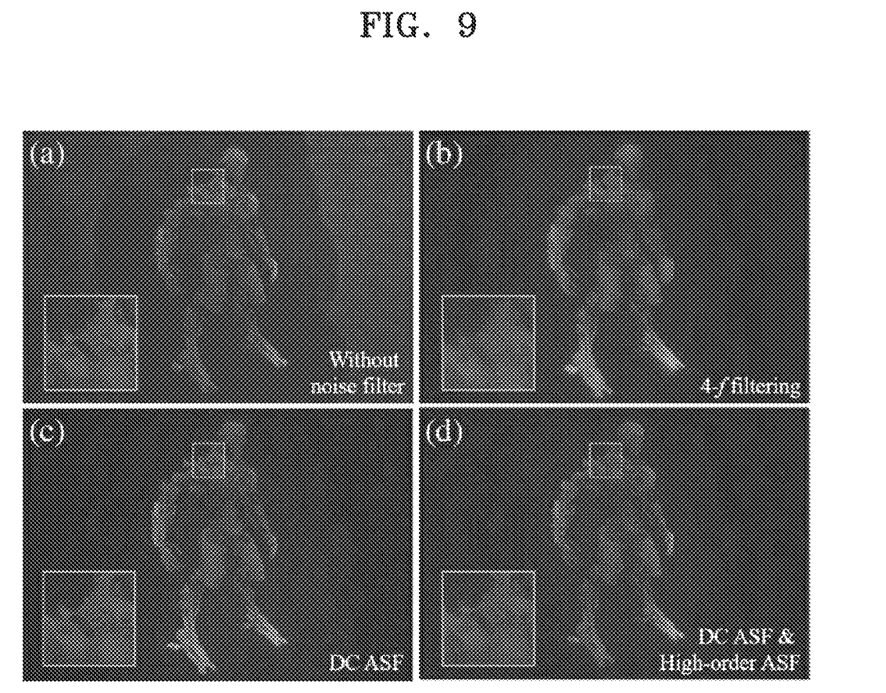
FIG. 9 shows holographic images captured before and after inserting a noise filtering apparatus according to an embodiment of the present disclosure.

FIG. 9 shows holographic images captured with respect to respective noise filtering methods. In order to filter noise caused by the speckle effect, a random pixel separation method is used. Object points are divided into thirty groups, and a hologram of each group is continuously displayed. FIG. 9A shows a holographic display without noise filtering. DC noise is present in the background.

FIG. 9C shows a display result when the first filter is applied. The background noise of FIG. 9A is significantly reduced by the first filter. Major DC noise is filtered by the first filter.

FIG. 9D shows a display result when the first filter and the second filter are used at the same time. Duplicate DC noise is filtered by the second filter, and thus, the background noise is reduced. Also, reduction in duplicate image noise is also observed.

While the present disclosure has been particularly shown and described with reference to embodiments thereof, it will be understood by those of ordinary skill in the art that various changes in form and details may be made therein without departing from the spirit and scope of the present disclosure as defined by the appended claims. The disclosed embodiments should be considered in a descriptive sense only and not for purposes of limitation. Therefore, the scope of the present disclosure is defined not by the detailed description of the present disclosure but by the appended claims, and all differences within the scope will be construed as being included in the present disclosure.

The invention claimed is:

1. A noise filtering apparatus for a holographic display, the noise filtering apparatus comprising:
   a first filter implemented using a volume grating for filtering DC noise in light modulated by a spatial light modulator; and
   a second filter implemented using a volume grating or a thin-film filter, which filters high-order noise in the light passing through the first filter,
   the first filter comprises:
   a first photo-thermo-refractive (PTR) transparent substrate; and
   a first volume grating engraved in the first PTR transparent substrate,
   wherein grating pattern intervals of the first volume grating are arranged to form a ring-shaped stop band of 0.5° or less when a Bragg angle is a first angle other than 0°,
   the first filter is arranged at an inclination of the first angle with respect to the spatial light modulator, and
   the DC noise output from the spatial light modulator at 0° is incident on the first filter at the first angle and is removed through the stop band of the first filter.

2. The noise filtering apparatus of claim 1, wherein the first angle is between 4 degrees and 6 degrees.

3. The noise filtering apparatus of claim 1, wherein the second filter comprises:
   a second PTR transparent substrate;
   a second volume grating engraved in the second PTR transparent substrate,
   wherein grating pattern intervals of the second volume grating are arranged with a Bragg angle being a second angle, and
   the second angle is determined by a pixel pitch of the spatial light modulator.

4. A noise filtering method for a holographic display, the method comprising:
   filtering DC noise in light modulated by a spatial light modulator, by using a first filter implemented using a volume grating; and
   filtering high-order noise in the light passing through the first filter by using a second filter implemented using a volume grating or a thin-film filter,
   the first filter comprises:
   a first photo-thermo-refractive (PTR) transparent substrate; and a first volume grating engraved in the first PTR transparent substrate,
wherein grating pattern intervals of the first volume grating are arranged to form a ring-shaped stop band of 0.5° or less when a Bragg angle is a first angle other than 0°,
the first filter is arranged at an inclination of the first angle with respect to the spatial light modulator, and
the DC noise output from the spatial light modulator at 0° is incident on the first filter at the first angle and is removed through the stop band of the first filter.

* * * * *